United States Patent Office 3,576,709
Patented Apr. 27, 1971

3,576,709
PROCESS FOR MAKING PULP UTILIZING A MIXTURE OF PHOSPHORIC AND NITRIC ACIDS
John W. Menzies, Laguna Hills, Calif., assignor to University Development Foundation
No Drawing. Continuation-in-part of application Ser. No. 696,501, Jan. 9, 1968. This application Nov. 25, 1968, Ser. No. 778,847
Int. Cl. D21c 11/00; C05f 11/00
U.S. Cl. 162—16                                            16 Claims

ABSTRACT OF THE DISCLOSURE

A process for pulping lignified plant materials to high or low grade pulps. The process employs an acid immersion step in a mixture of phosphoric and nitric acids. All or any lesser amount of the acid-lignin reaction products may be removed by immersion in an alkaline solution of a soluble potassium compound and ammonium hydroxide. Substantially all of the reactants are utilized to produce pulp or recoverable by-products so that air and ground water contamination are avoided.

RELATED APPLICATIONS

This is a continuation-in-part of U.S. patent application Ser. No. 696,501 filed Jan. 9, 1968, now abandoned for "Process for Making Pulp" by John W. Menzies.

BACKGROUND OF INVENTION

The ability of certain inorganic acids to oxidize and hydrolyze the lignin constituents in fibrous plants so that they can be solubilized and separated from the cellulose fibers to make pulp has been known for over one hundred years.

In that time literally hundreds of people have studied and devised processes for inorganic acid pulping without developing a process that could economically compete with other existing processes. This was due to the high cost of reagents and failure to completely effect the partial recovery of the reagents or to make a conversion of the balance to commercially marketable by-products.

The ability of hot alkaline solutions to dissolve the lignin constituents in fibrous plants and thus separate them from the cellulose fibers has long been known and practiced.

In order to develop a commercially competitive process the alkaline reagents used must be either capable of recovery from spent liquors in an economical manner, as is done in existing alkaline processes, or must be converted into marketable by-product chemicals that have commercial value commensurate with their original cost.

Thus, there is a need for a process in which comparatively low cost reagents can be used and in which maximum partial reagent recovery is made with the balance of the reactants being convertibile to marketable by-product chemicals.

There is also a great need for such a process which is usable by small plants for producing pulp in comparatively small tonnages ranging from fifty to two hundred tons per day so that the plants can be located adjacent to manufacturing and marketing areas. This is due to the high cost of freight in shipping either pulp or paper products from remote locations as exists for most pulp producing facilities.

The quality of pulp required from these comparatively small plants ranges from high yield pulp for use as fillers in plastic molding, paper board and felts, medium yield pulp for molding or pressing into food display or packaging containers to lower yield pulps for newsprint, paper bags or finer papers.

There is also a great need for a process which is usable in small plants for producing pulp from agricultural wastes such as cereal straws, rice, wheat and barley or stems such as tobacco, cotton or corn stalks.

In all cases the use of these materials, which are otherwise waste products, to make pulp will provide much needed additional revenue to growers. In the case of rice straw and some stems the present method of disposal is by burning. This will soon not be tolerated due to air pollution and some other effective means of disposal without air or ground water pollution must be provided. This is particularly true in some of the agricultural areas in California where air pollution is a critical problem.

Existing pulping processes, except pulp reclaiming processes, that can produce pulp in the yield ranges needed require extensive and expensive chemical reclaiming facilities with fume and fly-ash control to avoid atmospheric and ground water pollution problems particularly attendant in heavily populated manufacturing and marketing areas. It is not economically feasible to provide these required reclaiming facilities in small plants.

SUMMARY OF INVENTION

This invention relates to a process for producing high or low yield pulp from fibrous plants utilizing a dilute aqueous solution of phosphoric acid and nitric acid. The temperature and the time of treatment are made sufficient to effect reaction of the solution with the lignins of the material to form an alkaline soluble reaction product but insufficient to effect substantial degradation of the cellulose fibrils.

The reacted lignin constituents of the fibrous plant materials may be left with the pulp or may then be treated with combinations of basic potassium salts and ammonium hydroxide in aqueous solution to solubilize and separate all or any lesser amount of the lignin constituents from the cellulose fibers.

The reaction between the nitric acid constituent in the dilute aqueous solution and the lignin constituent in the fibrous plant is apparently primarily one of nitration, oxidation and hydrolysis. The exact chemistry of the reaction is very complex and is not known.

The process is adaptable for use with any fibrous, lignified-cellulose plant materials. Some of the materials, such as some straws and wood with high crystalline deposits may have to be pretreated for producing high quality pulps however. For example the material may be washed and then exposed to live steam to remove excess air and moisture so that it is more susceptible to reactant penetration. The material may then be immersed in a hot aqueous solution of potassium hydroxide, or other soluble potassium compound such as potassium chloride and ammonium hydroxide to dissolve the surface lignins prior to treatment with the aqueous acid solution.

The process of this invention thus provides a flexible method for making pulp by separating all or any lesser amount of the lignin constituents from the cellulose fibers, without appreciable degradation of the cellulose fibers, in hard or soft woods, agricultural straws, hulls, vines, stalks, grasses or other fibrous plants to produce high or low yield pulp and produce as by-products various chemicals derived from the pulp feedstock and from reagents used in the process.

The pulping process of this invention has certain features which alone or in combination distinguish it one way or another over the existing mechanical, semi-chemical or chemical processes.

One feature of this invention is that the process is usable economically and competitively in comparatively small plants of fifty tons per day capacity or more so that freight costs can be maintained low due to plant location adjacent to manufacturing, marketing or agricultural areas.

Another feature of the process of this invention is that it provides increases in revenue due to production of marketable by-products such as organic and inorganic acids, pentosans and fertilizer compositions. The fertilizer producing by-products may be adjusted by varying the reactant materials to produce balanced fertilizers of any desired balancing composition. Balanced fertilizers, as used herein, are those containing nitrogen, phosphates and potassium.

Still another feature of the process of this invention is that it is adaptable for treatment of a wide range of fibrous plant materials.

Another feature of the process of this invention is that substantially all of the reactant materials can be utilized or reclaimed with the absence of air and water pollution.

DESCRIPTION OF INVENTION AND PREFERRED EMBODIMENTS

The process of this invention may be carried out on either a batch or continuous basis. For a better appreciation of the process the various steps or phases of it are set apart by one line paragraph headings.

PRETREATMENT

For some materials a pretreatment must be used to prepare the material for treatment by the nitric-phosphoric acid solution. This pretreatment involves washing the raw material, in chip or other prepared form, in water to remove dirt or entrained foreign objects. The washed materials are then exposed to live steam to remove air and excess moisture to make the material more susceptible to reactant penetration.

The steam pressure is preferably maintained at from 5 to 25 p.s.i. and the materials are maintained in contact with the steam for from 5 to 300 seconds. This may take place in a pressure vessel wherein the steam temperature is maintained high enough to provide a saturated steam.

With continued reference to the pretreatment stage of the process of this invention, the materials may then be immersed in a hot dilute aqueous basic solution of a mixture of potassium hydroxide (or other water soluble potassium compounds such as potassium chloride) and ammonium hydroxide to dissolve surface lignins and/or shell as on the outer surface of straws from the material. The alkaline solution may comprise from 1 to 10% by weight potassium hydroxide or other water soluble potassium compound and from 1 to 10% by weight ammonium hydroxide in water. Alkaline solutions of 2–3% of the potassium compound and 2–3% of the ammonium hydroxide have been found to be preferable.

The material being processed is then separated from the alkaline soluion and the excess alkaline solution is drained therefrom. This completes the pretreatment phase of the process of this invention. When the quality of pulp is not required to be high, the pretreatment phase may be eliminated from the process.

Material conditioning

After pretreatment, or initially if the pretreatment is omitted, the materials being processed are exposed to live steam to remove air and excess moisture to condition them for treatment with the impregnating acidic solution. The steam temperature and pressure are substantially the same for this steam treament as for that referred to in the pretreatment phase of the process. Again the materials are contacted with steam in this step of the process for from 5 to 300 seconds.

This step may be omitted where excess moisture is not present in the material and where the material is already sufficiently porous so that it can be impregnated by the acid solution.

Acid immersion

The material being processed is then immersed in a hot dilute aqueous solution of a mixture of phosphoric acid and nitric acid in sufficient amount and strength to fully saturate these materials and to initiate reaction between the lignins of the material and the acid of the solution. The phosphoric acid incorporated in the acid immersion solution has been found to reduce the detrimental effect of the nitric acid on the cellulose.

A "dilute aqueous solution of acids" as used herein means that the solution comprises less than 50% by weight acids.

It has been found that the temperatures and times in the acid treating step may be varied over a wide range depending upon the degree of delignification required. For example the temperature may be varied up to about 98° C., higher temperatures are ordinarily impractical due to evaporation of the nitric acid and water. The preferred temperature range is from ambient to 80° C. with the most preferred temperature being about 75° C. The most favorable length of contact time for treatment in the temperature range set forth is from 5 to 20 minutes. At 75° C. the lignins are sufficiently reacted in about 15 minutes. As expected, if the nitric acid concentration increases the contact time required is decreased. The acid immersion treatment is substantially pressure independent.

It has been found that the composition of the dilute acid solution may preferably be varied between from 1 to 25% by weight nitric acid and from 1 to 25% by weight phosphoric acid in an aqueous media. If the acid content is less than 1%, the time required for initiating the reaction becomes undesirably long. It has been found that if the acid concentration is greater than 50%, excessive cellulose degradation occurs. The proportions of nitric and phosphoric acid may be adjusted to vary the amount of nitrates and phosphates in the recovered liquors and in the fertilizer produced as a by-product of the process.

REACTION AND ACID STRIPPING

After initiating the reaction, the material being processed is then separated from the acid solution and excess solution is removed by draining and/or mechanical means such as pressing, spinning or vibrating. The acid impregnated materials are then heated to temperatures of about 97° C. so that the exothermic nitration, oxidation and hydrolysis reactions with the acids continue. Air and steam are brought into contact with the materials while they are maintained at this elevated temperature to strip excess nitric acid, oxides of nitrogen and volatile reaction products such as carbon monoxide and carbon dioxide from the materials and the reactions are allowed to continue.

These materials may be subjected to a slight vacuum of from 5 to 10 mm. of mercury while the reaction is continuing. This facilitates the steam stripping of the nitric acid and other volatile reaction products from the materials. The materials may be maintained at this temperature for from 5 to 120 minutes depending upon the acid concentration used and the type material being treated. It has been found that a reaction time of about 45 minutes is usually sufficient.

The excess nitric acid which is evaporated during the reaction step is separated from the materials and recovered.

Neutralization and fiber separation

The material being processed is then neutralized with a dilute aqueous solution of a mixture of potassium hydroxide (or other soluble potassium compound) and ammonium hydroxide in a highly agitated conventional mechanical pulper or fiberizer to stop further reaction and to separate the fibrous material into individual separate fibers. The composition may be substantially the same as that used in the alkaline pretreatment, i.e. from 1 to 10% by weight of the soluble potassium compound and from 1 to 10% by weight of ammonium hydroxide in water. The preferred solution comprises from 2 to 3% potassium hydroxide and from 2 to 3% ammonium hydroxide. The alkalinity of the solution in this step of the process need only be sufficient to neutralize the acids and stop the nitration, oxidation and hydrolysis reactions without solubilizing the reacted lignins. The pH of the final mixture is controlled at about 7 although a pH of up to about 8.5 can be tolerated.

The materials are highly agitated in the neutralizing and fiber separation step for from 3 to 30 minutes depending upon the quality of the pulp to be produced and the desired amount of reacted lignins to be removed. After agitation, the materials are then separated from the neutral solution and are transferred to a conventional pulp processing line. Although not practical, these materials can be allowed to remain in the neutral solution for much longer times without detrimental effect.

Solubilizing alkaline immersion

An alkaline immersion step may be employed to solubilize all or any lesser amount of the reacted lignins for separation from the pulp. For high yield pulp this step can be omitted since the oxidized and/or hydrolyzed lignin constituents are not removed but remain attached to the cellulose fibers.

For the production of intermediate yield or low yield pulps the oxidized, and/or hydrolyzed lignins are solubilized and separated from the cellulose in a hot alkaline aqueous solution of from 1–10% by weight of a soluble potassium compound and 1–10% by weight of ammonium hydroxide. The temperature of the solution may be varied from 70 to about 100° C. at atmospheric pressures and up to 135° C. if pressures up to about 30 p.s.i. are employed. The material is maintained in the alkaline solution for about 30 minutes to produce the intermediate yield pulps and for about 90 minutes to produce the low yield pulps for example at 100° C. and atmospheric pressure.

Pulp recovery

The further processing of the pulp may follow conventional practices of washing, alkaline cooking under pressure or not under pressure, fiberizing, beating and screening depending upon the pulp quality and end use desired.

Reactant and by-product recovery

In this process all liquid effluents from the process steps that contain a sufficient amount of reactant are processed and extracted chemicals are collected and treated. All of the acid effluent are sent to a distillation and recovery facility for separation and recovery of process reactants and chemicals being extracted from the material being processed. A portion of the nitric acid is recovered by distillation. The organic acids: formic, acetic and oxalic and the pentose (produced from the hydrolysis of the pentosans) may be recovered by distillation or a combination of distillation and solvent extraction.

All the alkaline effluent and non-evaporated acidic effluent (bottoms from the distillation column), after extraction of reactant and by-product chemicals, are mixed, concentrated by evaporation, and adjusted to an alkaline pH to keep the dissolved materials soluble to make a marketable nitrogenous, phosphoric, potassium, ligneous fertilizer in liquid form. If solid fertilizer is desired the liquid effluents may be spray dried or precipitated. The fertilizer balancing formula may be varied in accordance with the amounts of nitric acid, phosphoric acid, ammonium hydroxide and potassium compounds used in the process.

The process vent gases and vapors are sent to packed scrubber columns where oxides of nitrogen are absorbed in accordance with conventional practice. Vent gases from the packed scrubber columns are incinerated preferably in a steam boiler firebox.

Discussion and examples

The acid solution-lignin reaction is one in which time, temperature and solution strength are controlling factors. The effect of various concentrations of nitric and phosphoric acid solutions was examined to determine the individual contribution of each to the process. Laboratory experiments have shown that with good reactant penetration the reaction can be carried to completion on pretreated wood chips in four hours time at ambient temperatures (20° C.) in a 42% $HNO_3$ solution.

Microscopic examination of the cellulose fibers particularly the microscopic fibrils showed considerable degradation probably due to nitration and hydrolysis of some of the cellulose after the long time exposure to the acid. The reaction can be carried out to apparently the same degree of completion with a 15% $HNO_3$ aqueous solution in 45 minutes at an elevated temperature of 79° C. with less degradation of the cellulose. This is probably due to a shorter period of exposure. There is also a saving in acid consumption in using the more dilute solution at the elevated temperature over the shorter period of time. This may be partially attributed to the smaller but still detrimental amount of cellulose degradation.

The oxidation and hydrolysis of the lignin constituents in fibrous plants with phosphoric acid is less vigorous than that with nitric acid. Microscopic examination of the cellulose fibers and fibrils showed no appreciable degradation or fibril damage after eight hours immersion of the same kind of wood chips as used in the nitric acid experiments in 98% phosphoric acid at 20° C.

Laboratory experiments made with a dilute aqueous solution of a mixture of 2% of phosphoric acid and 13% of nitric acid, with the same kind of wood chips with an acid immersion time of 15 minutes at 75° C. and a reaction and stripping time of 40 minutes at 95° C. showed no discernible deterioration of the cellulose fibers. The reaction and stripping step after the acid immersion comprises reaction between the acids and lignin constituents of the fibrous material and steam stripping of excess nitric acid from the impregnated material being processed by raising the temperature above the boiling point of the nitric acid (86° C.).

After alkaline removal of the oxidized and hydrolyzed lignin constituents, the pulp hand sheets showed good strength and pliability. This experiment was repeated several times with the conclusion that apparently the phosphoric acid while acting as an oxidizing and hydrolyzing agent also acts as an inhibiting agent in the cellulose-nitric acid nitration and/or hydrolysis reactions.

Laboratory runs made to produce pulp have shown the importance of even and thorough impregnation of the acid constituents throughout the lignin-cellulose structure during immersion. This is of particular importance in making low yield high grade pulps. The steaming steps of the pretreatment and prior to the acid immersion, although not always essential, enhance even penetration of the pulp by removing air and excess moisture which may block even impregnation.

Other agents which may block even impregnation of wood chips are crystalline deposits in the pit passages and canals of the wood growth. Experiments have shown that the pretreatment immersion in a hot dilute aqueous alkaline solution of a mixture of water soluble potassium compounds (potassium chloride and/or potassium hydroxide) and ammonium hydroxide is very effective in dissolving these crystalline deposits. In general a mixture of 2 to 3% of potassium chloride or hydroxide and 2 to 3% of ammonium hydroxide in water at 75° C. will accomplish the desired results.

The shell or case on stems such as tobacco or cotton or the weatherproof glaze on the outside of cereal straws, particularly rice straw, also acts to prevent the even impregnation of acid reactants. These may be readily removed by steaming or a combination of steam and dissolving in a hot dilute alkaline solution in the pretreatment.

In order that those skilled in the art may more completely understand the present invention and the preferred methods by which the same may be carried into effect, the following specific examples in tabular form are offered.

|  | Example number | | | | | |
|---|---|---|---|---|---|---|
|  | 1 Rice straw | 2 Rice straw | 3 Wheat straw | 4 Redwood | 5 Pine | 6 Oak |
| Moisture (material as received), percent | 13 | 9 | 6 | 123 | 90 | 152 |
| Weight material (as received), grams | 514 | 495 | 481 | 1,012 | 863 | 1,145 |
| Weight material (oven dry basis), grams | 454 | 454 | 454 | 454 | 454 | 454 |
| Steam (20 p.s.i.) | [1]14 | [1]12 | [1]10 | [2]7 | [2]4 | [2]10 |
| Immersion in alkaline solution; time, minutes | 5 | 5 | 5 | 5 | 15 | 15 |
| Solution strength: | | | | | | |
| KOH, percent | 3 | 3 | 3 | 3 | 2 | 4 |
| NH$_4$OH, percent | 3 | 2 | 3 | 3 | 4 | 2 |
| Temperature, °C | 75 | 75 | 75 | 75 | 75 | 75 |
| Drain, minutes | 15 | 15 | 15 | 15 | 15 | 15 |
| Steam (20 p.s.i.) | [1]12 | [1]10 | [1]8 | [2]5 | [2]4 | [2]6 |
| Immersion in acid solution; time, minutes | 10 | 10 | 16 | 21 | 15 | 20 |
| Solution strength: | | | | | | |
| H$_3$PO$_4$, percent | 3 | 5 | 3 | 3 | 7 | 4 |
| HNO$_3$, percent | 12 | 10 | 12 | 15 | 12 | 15 |
| Temperature, °C | | | | 75 | 75 | 75 |
| Drain time, minutes | 20 | 20 | 15 | 15 | 15 | 15 |
| Reaction-steam scrub: | | | | | | |
| Time, minutes | 29 | 31 | 28 | 48 | 67 | 63 |
| Temperature, °C | 97 | 97–98 | 97–98 | 96–98 | 96–98 | 96–98 |
| Vacuum, mm. Hg | 10–15 | 10–15 | 10–15 | 10–15 | 10–15 | 10–15 |
| Air (not measured) | | | | | | |
| Steam (not measured) | | | | | | |
| Neutralization; temperature (at start), °C | 60 | 60 | 60 | 60 | 80 | 80 |
| Strength basic solution: | | | | | | |
| KOH, percent | 2 | 2 | 2 | 2 | 2 | 2 |
| NH$_4$OH, percent | 2 | 2 | 2 | 2 | 2 | 2 |
| Drain, minutes | 15 | 15 | 15 | 15 | 15 | 15 |
| Wash (on screen), minutes | 2 | 2 | 2 | 3 | 2 | 4 |
| Lignin digestion: | | | | | | |
| Time, minutes | 60 | 65 | 47 | 60 | 60 | 90 |
| Temperature, °C | 80 | 80 | 79 | 80 | 80 | 80 |
| Solution strength: | | | | | | |
| KOH, percent | 3 | 3 | 3 | 3 | 3 | 3 |
| NH$_4$OH, percent | 3 | 3 | 3 | 3 | 3 | 3 |
| Drain, minutes | 15 | 15 | 15 | 15 | 15 | 15 |
| Wash (on screen), minutes | 2 | 2 | 2 | 2 | 2 | 2 |
| Beat, minutes | 10 | 10 | 10 | 15 | 15 | 20 |
| Yield (oven dry basis), grams | Ⓐ245 | Ⓐ243 | Ⓑ244 | 238 | 240 | Ⓒ |

Ⓐ Some pulp lost in washing; Ⓑ Some loss in screen; Ⓒ Yield not determined since cellulose lost in wash.
[1] Seconds.
[2] Minutes.

The invention may be embodied in other specific forms without departing from the spirit or essential characteristics thereof. The present embodiment is therefore to be considered in all respects as illustrative and not restrictive.

What is claimed and desired to be secured by Letters Patent is:

I claim:

1. In a process for producing high or low yield pulp from lignin containing cellulose plant material, the improvement comprising contacting said material with a dilute aqueous phosphoric acid-nitric acid solution comprising from about 1 to 25% by weight phosphoric acid and from about 1 to 25% by weight nitric acid at temperatures above ambient sufficient to effect reaction of the phosphoric-nitric acid solution with their lignins to form a lignin reaction product which is highly soluble in alkaline solution but insufficient to effect substantial degradation of cellulose fibrils of said plant material.

2. A process as defined in claim 1 wherein said reaction of said acid solution with said lignin is stopped by contacting said material with an aqueous alkaline solution.

3. A process as defined in claim 2 further including the steps of dissolving all or any lesser amount of said reaction product in an alkaline solvent therefor which is substantially inert to said cellulose and separating said dissolved reaction product and said solvent from said pulp.

4. A process as defined in claim 1 wherein said material is contacted with said acid solution at a temperature of from about ambient to 98° C.

5. A process as defined in claim 4 wherein said material is contacted with said acid solution for from 5–20 minutes.

6. A process as defined in claim 1 wherein the phosphoric acid concentration of said solution is sufficient to inhibit reaction between said cellulose and said nitric acid.

7. A process as defined in claim 3 wherein said alkaline solution and said alkaline solvent each comprise from 2 to 3% by weight of a soluble potassium compound, from 2 to 3% by weight ammonium hydroxide and the balance water.

8. A process as defined in claim 7 wherein the improvement further comprises pretreating said material in a first stage alkaline solution of from 1 to 10% by weight of a water soluble potassium compound, from 1 to 10% by weight ammonium hydroxide and the balance water.

9. A process as defined in claim 8 including the step of recovering the spent liquors from said acid solution treating step and from said alkaline treating steps to produce organic or inorganic acids, pentose and a nitrogen, phosphorous and potassium containing mixture suitable for use as a fertilizer.

10. A process for producing high or low yield pulp from lignin containing cellulose plant material, comprising contacting said material with an aqueous phosphoric acid-nitric acid solution comprising from about 1 to 25% by weight phosphoric acid and from 1 to 25% by weight nitric acid at a temperature of from ambient to about 98° C. to effect reaction of the phosphoric acid-nitric acid solution and the lignin to form a lignin reaction product which is highly soluble in alkaline solution and stopping said reaction by immersing said material in an aqueous alkaline bath comprising 1 to 10% by weight of a water soluble potassium compound and 1 to 10% by weight ammonium hydroxide.

11. A process for producing pulp from lignin containing cellulose vegetable material comprising the steps of:
subjecting said material to steam to soften said material, evaporate the moisture therefrom, and remove the air for enabling the penetration of subsequent treating materials more thoroughly into the structure of the material;
immersing said material in an alkaline solution;
removing said material from said alkaline solution;
subjecting said material to steam to drive moisture from said material;
immersing said material in a dilute acid solution of nitric and phosphoric acid comprising from about 1 to 25% by weight phosphoric acid at temperatures sufficient to impregnate said material to effect reaction of the solution with the lignins of the material to form an alkaline soluble reaction product but insufficient to effect substantial degradation of cellulose fibrils of said material;
removing said impregnated material from said acid solution;
increasing the temperature of said impregnated material to increase the rate of the nitration, oxidation and hydrolysis of the lignins of said material and to evaporate excess nitric acid from said material;
subjecting said material to a hot alkaline solution in an agitated reaction zone to neutralize said material;
recovering said material from said alkaline solution; and
recovering the liquid effluent from each of the above process steps and concentrating said liquid effluents to form inorganic and organic acids, pentose and a phosphorous and nitrogen containing by-product suitable for use as a fertilizer.

12. A process as defined in claim 11 wherein said alkaline solution comprises ammonium hydroxide and potassium compounds and the amounts of nitric acid, phosphoric acid, potassium compounds and ammonium hydroxide are varied to produce any desired balancing formula for the fertilizer composition.

13. A process as defined in claim 11 wherein said alkaline solution is an aqueous solution of 2 to 3% by weight potassium compound and 2 to 3% by weight of ammonium hydroxide.

14. A process as defined in claim 11 wherein the temperature of said impregnated material is increased to from above ambient to about 98° C.

15. A process as defined in claim 11 further including the step of immersing said materials in a solubilizing alkaline solution after said materials have been neutralized to solubilize the reacted lignins and produce a high-quality, low-yield cellulose pulp.

16. A process as defined in claim 15 wherein said solubilizing alkaline solution comprises from 1 to 10% by weight water soluble potassium compounds and from 1 to 10% by weight ammonium hydroxide and wherein said solubilizing alkaline solution is maintained at a temperature of from 70 to 135° C.

References Cited

UNITED STATES PATENTS

| | | | |
|---|---|---|---|
| 3,130,115 | 4/1964 | Thomsen | 162—16 |
| 3,222,160 | 12/1965 | Ramus | 71—23 |

FOREIGN PATENTS

| | | | |
|---|---|---|---|
| 512,644 | 10/1920 | France | 162—80 |

OTHER REFERENCES

Pulp & Paper, Mar. 20, 1961, pp. 15 and 19.

HOWARD R. CAINE, Primary Examiner

U.S. Cl. X.R.

71—23, 25; 162—80